Oct. 8, 1963 H. S. KNUDSEN 3,106,364
LEADER ATTACHMENT FOR REELS
Filed Feb. 13, 1962

INVENTOR.
HAROLD S. KNUDSEN
BY David K. Kilgore
ATTORNEY

1

3,106,364

LEADER ATTACHMENT FOR REELS

Harold S. Knudsen, 5241 Drew Ave. N., Minneapolis 22, Minn.

Filed Feb. 13, 1962, Ser. No. 172,955
6 Claims. (Cl. 242—74)

This invention relates broadly to sound recording tape and motion picture film, more particularly to the storage of such tape and film on conventional storage reels and specifically to a means for attaching such tape and film to said storage reels.

It is well known by those who are familiar with tape recording instruments and home type motion picture cameras and projectors, that it is always a problem to initially secure the sound tape or film to the hub of the conventional tape or film storage reel. Generally, the said hubs are provided with one or more transversely disposed slots into one of which the end portion of the tape or film is inserted after a fold has been formed therein adjacent said end portion. Normally such tape or film is relatively brittle and being very smooth and slippery and accordingly it is almost always difficult to retain the free folded end portion of the tape or film in the slot while the first few laps of the said tape or film are cast on the said hub of the storage reel to secure the same thereon. It will, of course, be understood that the invention is capable of use whereas tapes of the class described are mounted and stored on storage reels having a center hub.

Accordingly, the principal object of this invention is to provide a means for attaching the free end portion of a sound tape or motion picture film to a storage reel.

Another object of this invention is to provide a means for attaching a sound tape or a motion picture film to a storage reel that is relatively inexpensive to manufacture and which will in no way interfere with normal operation of a recording instrument or film projector.

These and other objects of the invention will become apparent from the following specification and claims when taken in conjunction with the accompanying drawing which forms a part of this application and in which drawing, like characters indicate like parts throughout the several views.

To to the above end, generally stated, the invention consists of the following devices and combination of devices hereinafter described and defined in the claims.

Referring to the drawing.

Figures 1, 2:
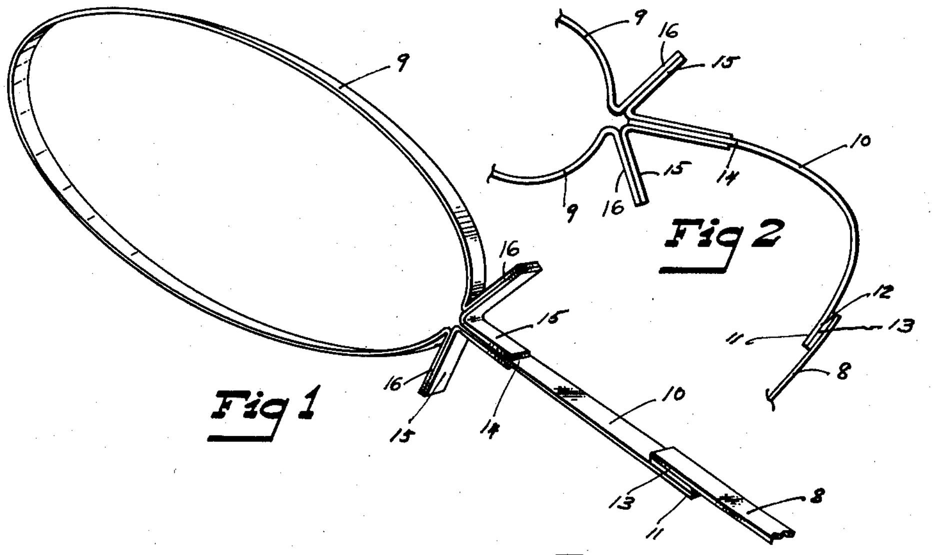
FIG. 1 is a perspective view of the invention with a fragmentary portion of sound tape or film attached thereto.
FIG. 2 is a side elevational view of the invention as shown in FIG. 1 with some parts being broken away.
Figure 3:
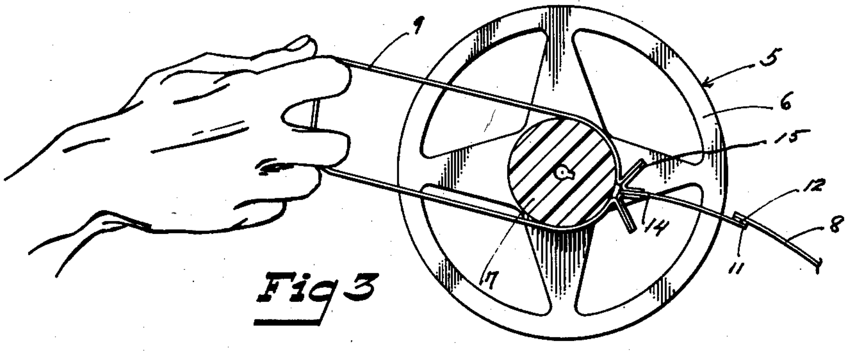
FIG. 3 is a side elevational view of the invention adjusted for mounting on a tape or film storage reel.
Figure 4:
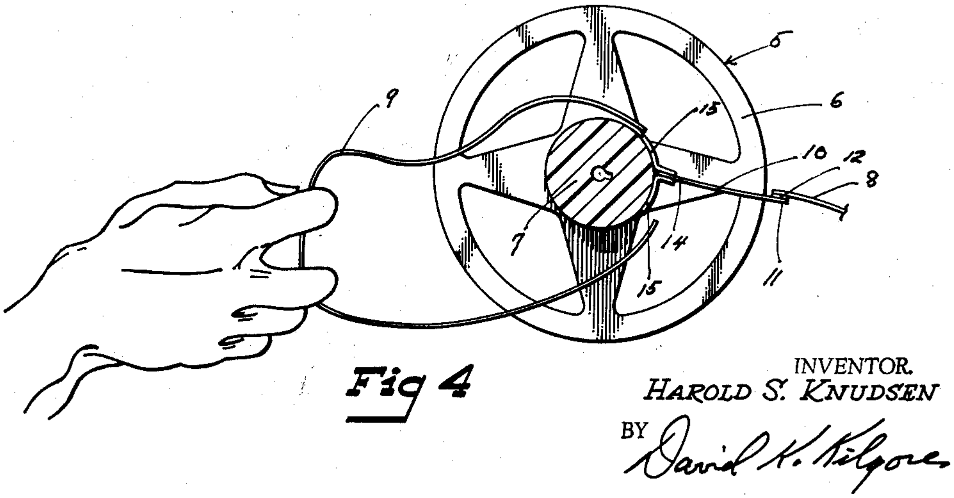
FIG. 4 is a view similar to FIG. 3 with the exception that the invention has been transferred to the tape or film storage reel.

The numeral 5 is directed broadly to a convenitonal tape or film storage reel having side flange plates 6 and a centrally disposed hub 7 mounted between the side flange plates 6. It will be understood that storage reels of the type described are generally provided with one or more transverse slots to receive the free end portion of sound tape or film strips, however, there slots are not shown on the drawing for the reason that said slots are not necessary to the successful carrying out of the subject invention.

The numeral 8 is directed to a fragmentary portion of a sound tape or film strip.

Referring now in detail to the invention, the numeral 9 indicates a flexible elongated strip of material in the

2 form of a tape and preferably made of a synthetic plastic material to impart tensile strength to this element which must withstand a reasonably heavy pull without elasticity as will presently appear. It is noteworthy to mention at this point that this element 9 is disposable when it has served its purpose, and will hereinafter be referred to as the mounting loop 9.

A leader element 10 dimensioned longitudinally according to the size of the reel 5 to which it is to be mounted, is formed of a somewhat less flexible material, preferably synthetic, is provided adjacent its outer end portion 11 with a relatively small pressure sensitive adhesive area 12 that is normally covered with a protective tab of material 13 which remains in such position until such time as the invention is to be put to use when said protective tab is discarded as will also presently appear.

The inner end portion of the leader 10 is provided with two relatively short tabs of pressure sensitive adhesive tape 15 approximately one half of each of which is applied to each side of the inner end portion 14 of the leader 10. The other substantially one half portion of each of the said tapes 15 extend outwardly to the said inner end portion 14 of the leader and the respective adhesive surfaces thereof are protected from inadvertent adhesive seizure of each other or any other surface or object by covering the said adhesive surfaces with the free end portions 16 of the mounting loop 9, is best seen in FIG. 2. To apply the free end portions 16 of the mounting loop 9 to the exposed adhesive surfaces of the tapes 15, the said mounting loop 9 is folded upon itself and the inner surfaces of its free end portions are applied to the entire exposed adhesive free end portions of the tapes 15 and thus afford a protective covering for the said exposed adhesive surfaces until removed during the mounting of the invention on the hub 7 of the storage reel 5.

It may be stated here that in actual commercial use a plurality of the herein described leaders will be mounted on a card not shown in lateral arrangement thereon to facilitate display storage and transport and it will only be necessary to strip the leaders therefrom individually as they are needed.

It is also noteworthy to mention that while the color of the several components is optional, the tapes 15 may be color indexed to facilitate instructions for use as printed on the mounting card and also to designate the size of a particular leader.

To carry out and make use of the invention to apply a sound tape or film strip to a storage reel 5, it is only necessary to first remove one single leader from the mounting card and thence open the mounting loop 9 so that the same may be looped over one of the flange plates 6 of the storage reel 5. The outer end portion 11 of the leader element 10 will then be pointing away from and outwardly of the hub 7 of the reel 5. A finger is then inserted in the mounting loop 9 and the entire assembly is drawn taut to properly align the leader 10 with the transverse center of the hub 7 of the storage reel 5. At this point in the mounting procedure it will be seen that the tapes 15 on the inner end portion 14 of the leader 10 will each respectively be positioned to partially encircle the hub 7 of the storage reel 5 circumferentially in opposite direction. When so positioned a relatively hard pull on the mounting loop 9 will strip the free end portions thereof from the adhesive surfaces of the tapes 15 and thus transfer the respective tapes to the hub 7 of the storage reel 5 with said adhesive surfaces gripping the said hub. The mounting loop 9 is discarded at this point.

The protective tab 13 is then removed from the pressure sensitive area 12 at the outer end portion 11 of the leader 10 and the shiny side of the end portion of the sound tape or film strip 8 placed in proper alignment with the leader 10 and then pressed into engagement with the pressure sensitive area 12 after which the said sound tape or film strip 8 may be wound onto the storage reel 5.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. A leader attachment for securing sound tapes and film strips to storage reels having side flange plates and a hub comprising in combination, a leader element having an inner end portion and an outer end portion, means in the outer end portion whereby a free end portion of a sound tape or a film strip is secured thereto, and means associated with the inner end portion of the leader whereby said leader may be adhesively secured to the hub of a storage reel and flexible means detachably secured to the leader whereby the same is applied to said hub.

2. A leader attachment for securing sound tapes and film strips to storage reels having side flange plates and a central hub comprising in combination, a leader element having an inner end portion and an outer end portion, adhesive means integral with the outer end portion of the said leader whereby a free end portion of a sound tape or film strip may be secured to said leader, adhesive means associated with the inner end portion of said leader in the form of a pair of tabs extending outwardly of the end portion of the said leader, said tabs having an adhesive applied to their respective inner surfaces, and means for temporarily covering said adhesive surfaces, a mounting loop in the form of a relatively long flexible tape the respective free end portions of which afford the temporary protective covering for the said pair of tabs on the leader, said mounting loop being dimensioned to extend over one of the side flange plates of the reel and position and transfer the said tabs in circumferential engagement with the hub of the reel when a pull is exerted on the said mounting loop to strip the free end portions of the mounting loop from the adhesive inner surfaces of the tabs.

3. The structure of claim 2 further including the color indexing of the said tabs.

4. The structure of claim 2 wherein the adhesive means on the outer end portion of the leader is temporarily covered with a protective backing.

5. The structure of claim 2 wherein the mounting loop and the protective backing of the adhesive means on the leader are disposable.

6. A leader attachment for securing sound tapes and film strips to conventional film storage reels having a pair of laterally spaced side flange plates centrally connected by a hub, said leader attachment comprising in combination, an elongated leader element having an inner end portion and an outer end portion, an adhesive area adjacent the outer end portion of said leader element, said adhesive having a temporary protective backing, said adhesive area affording means whereby a free end portion of a sound tape or a film strip may be secured to the leader element, a pair of tabs adhesively secured to the inner end portion of the leader element and extending outwardly of the said inner end portion of the leader element, adhesive means having a temporary backing on the inner opposed surfaces of the outwardly projecting tabs, a relatively long, flexible mounting loop constructed and dimensioned to extend over one of the side flange plates of the storage reel, said mounting loop being closed by applying the free end portion thereof to the free end portion of the outwardly projecting tabs whereby the adhesive inner opposed surfaces of the said tabs are provided with a temporary backing for said adhesive surfaces.

References Cited in the file of this patent

UNITED STATES PATENTS

| | | |
|---|---|---|
| 2,541,476 | Mahalyi | Feb. 13, 1951 |
| 2,571,796 | Ulmschneider et al. | Oct. 16, 1951 |
| 2,900,868 | Gaffney | Aug. 25, 1959 |